United States Patent
Song et al.

(10) Patent No.: US 8,172,755 B2
(45) Date of Patent: May 8, 2012

(54) FRACTIONAL DELAY FILTER-BASED BEAMFORMER APPARATUS USING POST FILTERING

(75) Inventors: Tai-Kyong Song, Seoul (KR); Jeong Cho, Seoul (KR); Jae-Hee Song, Seoul (KR)

(73) Assignee: Industry-University Cooperation Foundation Sogang University, Seoul (KR)

( * ) Notice: Subject to any disclaimer, the term of this patent is extended or adjusted under 35 U.S.C. 154(b) by 1011 days.

(21) Appl. No.: 11/952,045

(22) Filed: Dec. 6, 2007

(65) Prior Publication Data

US 2008/0167558 A1 Jul. 10, 2008

(30) Foreign Application Priority Data

Dec. 15, 2006 (KR) .................. 10-2006-0128906

(51) Int. Cl.
*A61B 8/00* (2006.01)
*G01S 15/00* (2006.01)
*G01N 24/00* (2006.01)
*G01N 29/00* (2006.01)

(52) U.S. Cl. ............. 600/447; 367/105; 73/625; 73/626

(58) Field of Classification Search .................. 600/459; 381/71.11, 92, 94.3; 73/626, 625; 367/105
See application file for complete search history.

(56) References Cited

U.S. PATENT DOCUMENTS

| 5,345,246 | A  | * | 9/1994  | Sezai ........................ 342/368 |
| 5,844,139 | A  | * | 12/1998 | Miller et al. .................. 73/602 |
| 5,905,692 | A  | * | 5/1999  | Dolazza et al. ............. 367/123 |
| 6,639,948 | B1 | * | 10/2003 | Tager ......................... 375/285 |
| 2004/0013038 | A1 | * | 1/2004 | Kajala et al. ............... 367/119 |
| 2005/0141731 | A1 | * | 6/2005 | Hamalainen ................ 381/94.3 |
| 2005/0193047 | A1 | * | 9/2005 | Fu et al. ...................... 708/300 |

\* cited by examiner

*Primary Examiner* — Long V. Le
*Assistant Examiner* — Helene Bor
(74) *Attorney, Agent, or Firm* — Christie, Parker & Hale, LLP

(57) ABSTRACT

A beamforming apparatus is provided for improving beamforming accuracy by employing fractional delay filters in an interpolation process and reducing hardware complexity by using post-filtering technique. The beamforming apparatus of the present invention includes a post-filtering means implemented with fractional delay filters that combines block data, on the respective channels, supposed to be fractionally delayed and obtains a delay value of fractional part from the combined data. The post-filtering means collects the block data of the channels assigned identical coefficients and performs a filtering process simultaneously.

13 Claims, 4 Drawing Sheets

FRACTIONAL DELAY FILTER-BASED BEAMFORMER APPARATUS USING POST FILTERING

CROSS-REFERENCE TO RELATED APPLICATION

This application claims priority of Korean Patent Application Number 10-2006-0128906, filed on Dec. 15, 2006.

BACKGROUND OF THE INVENTION

1. Field of the Invention

The present invention relates to a beamforming apparatus for an ultrasonic imaging system and, in particular, to a beamforming apparatus that is capable of generating appropriately delayed samples in a broad frequency spectrum by implementing fractional delay (FD) filter using post-filtering which requires lower hardware complexity than the conventional interpolation filter or IQ phase rotator.

2. Description of the Related Art

Conventional delay-sum beamformers employ four-fold interpolation filters for effectively increasing data transmission rate (over 16 $f_0$ for fine delay control). Finite impulse response (FIR) filters are ideal for this effect since FIR filters generate delayed samples with no phase error but with some amplitude errors. However, the interpolation filter requires a plurality of multipliers. In the meantime, a phase rotation beamformer requires two FIR low pass filters (FIR LPFs) for In-phase and Quadrature (IQ) demodulation and 4 real number multipliers for phase rotation of IQ signals per channel.

However, such types of beamformers have been developed for creating high quality video image, thereby being not appropriate for portable ultrasonic scanners that should be designed in consideration of power consumption, manufacturing cost, and size.

SUMMARY OF THE INVENTION

The present invention has been made in an effort to solve the above problems and it is an object of the present invention to provide a beamforming apparatus and method for an ultrasonic imaging system that are capable of reducing hardware complexity by employing post filtering techniques using a fractional delay filter.

In accordance with an aspect of the present invention, the above and other objects are accomplished by a multichannel beamforming apparatus for an ultrasonic imaging system which includes a memory for storing sampled data for each channel and a means for generating block data on the basis of an integer part of a delay value. The multichannel beamforming apparatus includes a post-filtering means including a fractional delay filter which combines block data, on respective channels, supposed to be identically fractionally-delayed and obtains a delay value of fractional part from the combined data, the post-filtering means combining the block data of the channels assigned an identical coefficient and performing a filtering process simultaneously.

In accordance with another aspect of the present invention, the above and other objects area accomplished by a beamforming method for an ultrasonic imaging system including a multichannel beamforming apparatus having a memory for storing sampled data for each channel and a means for generating block data on the basis of an integer part of a delay value. The beamforming apparatus of the present invention includes post-filtering including combining block data supposed to be identically fractionally-delayed and obtaining a delay value of fractional part from the combined data, the block data assigned an identical coefficient being combined and filtered simultaneously.

BRIEF DESCRIPTION OF THE DRAWINGS

The above and other objects, features and advantages of the present invention will be more apparent from the following detailed description in conjunction with the accompanying drawings, in which.

DETAILED DESCRIPTION OF EXEMPLARY EMBODIMENTS

Figure 1:
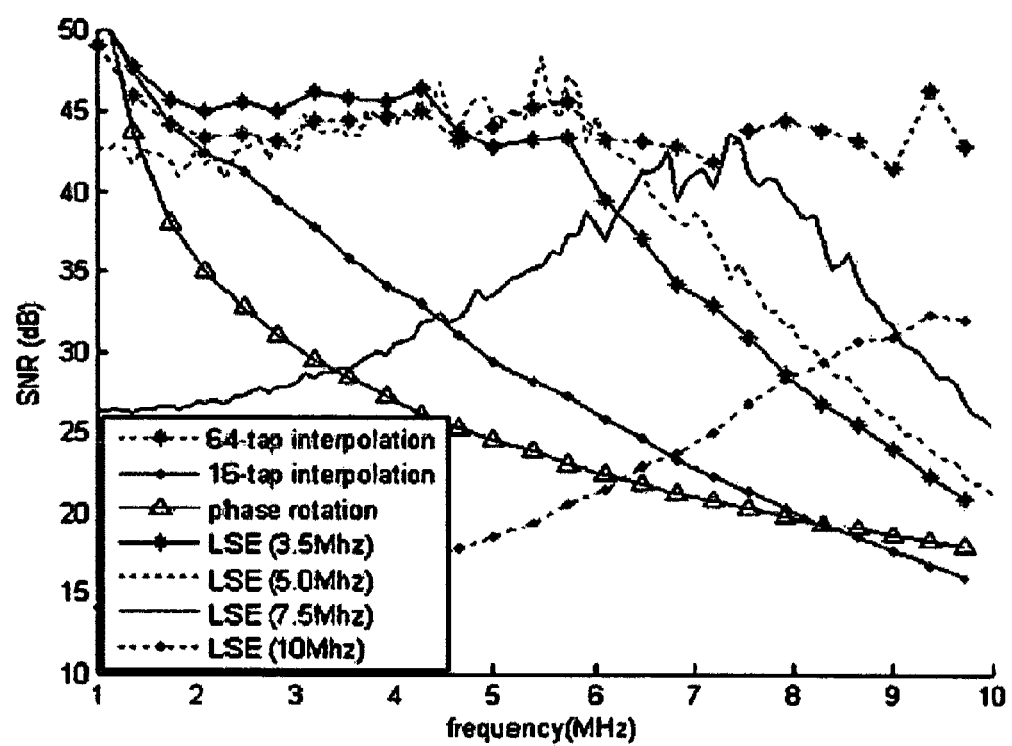
FIG. 1 is a graph illustrating signal-to-noise ratios (SNRs) of different beamforming techniques in a limited frequency spectrum.

Exemplary embodiments of the present invention are described with reference to the accompanying drawings in detail. The same reference numbers are used throughout the drawings to refer to the same or like parts. Detailed descriptions of well-known functions and structures incorporated herein may be omitted to avoid obscuring the subject matter of the present invention.

The beamforming apparatus of the present invention includes a memory for quantizing a received signal and storing the quantized result to apply different delay values to respective channels. From the memory, only the integer of the delay value is read out for obtaining block data. Meanwhile, in order to improve the beamforming accuracy, fine a delay value should be obtained. For this reason the fractional part of the delay value is calculated. In order to recover the received value using the fractional part of the delay value, a fractional delay value is used. A number of taps of the fractional delay filter can be changed depending on the target performance of the beamforming apparatus, and a number of filter sets is determined depending on the fineness of the target delay value. A set of fractional delay filters (coefficients) is determined by the fractional part of the delay value. In the present invention, the channels using the same coefficient value are summed and then filtered simultaneously, which is called post-filtering. Such post-filtering technique allows beamforming with a single filtering process regardless of the number of channels of the beamforming apparatus, resulting in reduction of hardware complexity.

In the present invention, all the channels requiring the same fractional delay are summed by block summation and the summed data are provided to the FD filter (i.e. one of 4 FD filters corresponding to the 0, 0.25, 0.5, and 0.75 sample delays). Accordingly, the beamforming apparatus can be implemented with 6 multipliers using diagonal characteristics of four 4-tap FD filters.

According to the simulation result, the FD beamforming apparatus of the present invention can achieve the image quality, with much simplified hardware configuration, nearly identical with that of the delay summation beamforming apparatus having 64-tap filter.

Filter Design and Optimal Hardware Configuration

The FD beamforming apparatus according to an exemplary embodiment of the present invention is similar to the interpolation beamforming apparatus in configuration except for using the FD filter rather than interpolation filter. Typically, the interpolation beamforming apparatus uses the 4-fold interpolation filter such that, in order to replace the interpolation filter with FD filter, the FD filter is required to provide a programmable fraction delay value D. The ideal response of the fractional delay value can be obtained by equation 1.

$$H_{ideal}(w)=e^{-jwD}, D=0, 0.25, 0.5, 0.75 \quad \text{Equation 1}$$

The beamforming apparatus according to an exemplary embodiment of the present invention employs the FD filter which improves the size and group delay response using 2-stage Least Square Estimation (LSE) technique. The FD filter coefficient minimizing the square error is calculated using equation 2. In equation 2, the limited frequency spectrum is in the range between $\alpha\pi$ and $\beta\pi$. The coefficient calculated by equation 2 is utilized as initial parameter of the optimization program for enhancing the filter response characteristics.

$$E_p = \frac{1}{\pi}\int_{\alpha\pi}^{\beta\pi} |H(e^{jw}) - H_{ideal}(e^{jw})|^2 dw \quad \text{Equation 2}$$

For example, the FD filter coefficients to the 5 MHz imaging frequency become (0, 0, 1, 0) to D=0, (−0.0677, 0.8320, 0.2788, −0.0498) to D=0.25, (−0.0788, 0.5742, 0.5742, −0.0788) to D=0.5, and (−0.0498, 0.2788, 0.8320, −0.0677) to D=0.75. The coefficients to D=0.75 are inversely ordered in comparison with those to D=0.25 in time, and the coefficients to D=0.5 are symmetrically arranged. The filter coefficients at other imaging frequency bands show identical symmetrical characteristics.

In order to evaluate the performance of the FD filter to the phase rotator and two interpolation filters, a computer simulation was executed for the reference signals $x_{ref}(n)$ (obtained by sampling gauss signals having 60% of 6 dB bandwidth at the 160 MHz imaging frequency band). Each reference signal is lowed to the sampling frequency of 40 MHz and used as the input data for all simulation methods. FIG. 1 is a graph illustrating signal-to-noise ratios (SNRs) of different beamforming techniques in a limited frequency spectrum. The SNR can be expressed as equation 3. In equation 3, $x_d(n)$ denotes 4-fold interpolation result of each method. In order to design a beamforming apparatus for portable scanners, an 8-bit signed integer format is used for representing the reference signal and all the coefficients are quantized to be assigned 12-bit numbers for fixed-point arithmetic.

$$SNR = 10\log\frac{\sum x_{ref}(n)^2}{\sum (x_{ref}(n) - x_d(n))^2} \quad \text{Equation 3}$$

The LSE-based FE filter provides enhanced SNR at the most imaging frequencies of 2, 3.5, 5, 7.5, and 10 MHz in comparison with phase rotator and 16-tap interpolation filter. In the meantime, the LSE-based FE filter shows the SNR lower than the 64-tap interpolation filter by as much as 2.75 dB and 10.93 dB at frequencies of 7.5 MHz and 10 MHz, respectively. Since the phase rotator has been successfully used for commercial products operating at the conventional imaging frequency bands, the 4-tap FD filter can be an effective imaging means to at least 10 MHz.

Figure 2:
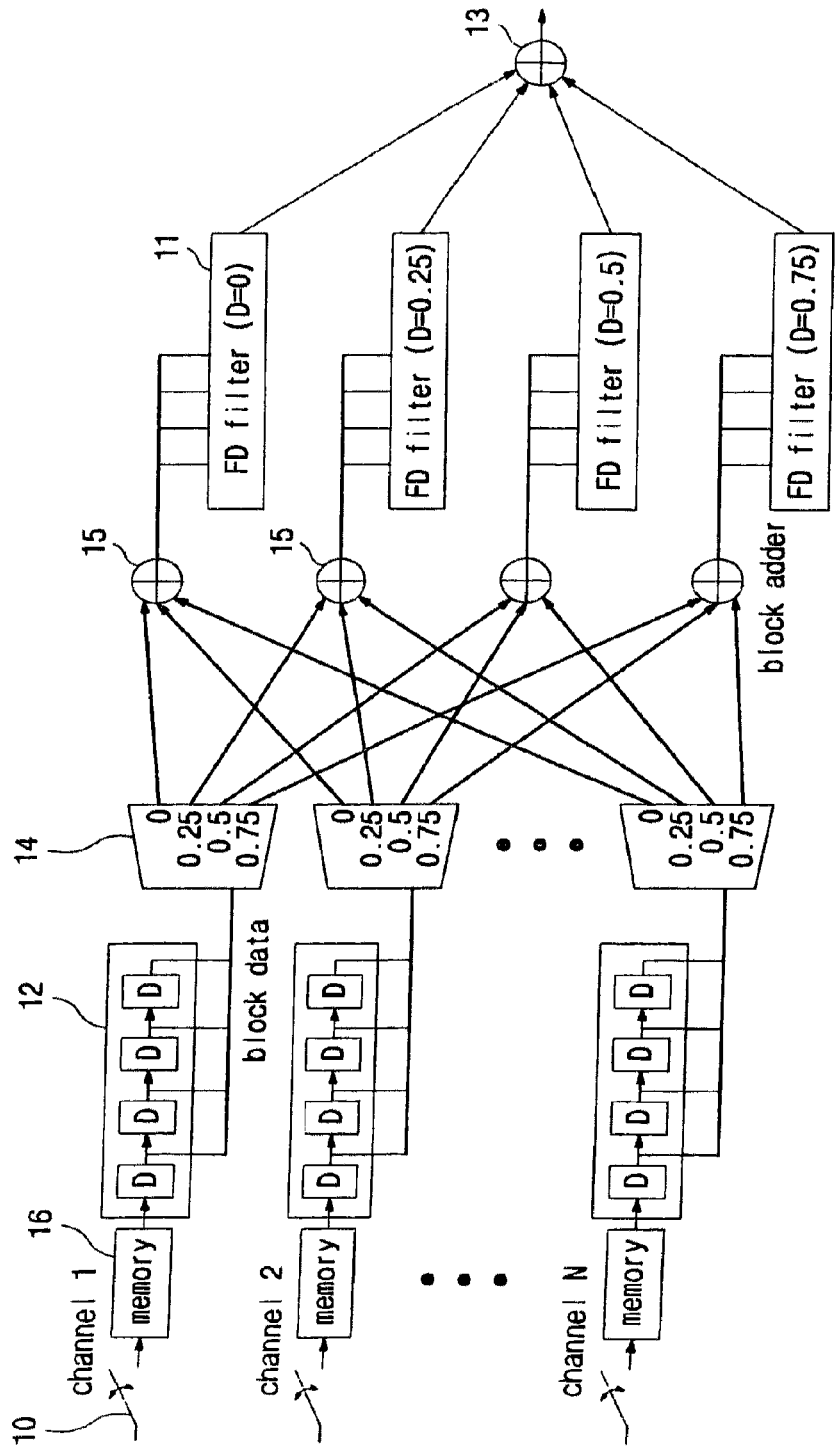
FIG. 2 is a block diagram illustrating a configuration of a beamforming apparatus according to an exemplary embodiment of the present invention.

FIG. 2 is a block diagram illustrating a configuration of a beamforming apparatus according to an exemplary embodiment of the present invention. In this embodiment, the beamforming apparatus is implemented with low hardware complexity by employing the post-filtering technique. In FIG. 2, the identically delayed block data 12 input through the respective channels 10 are summed by block adders 15. Each block data 12 consists of 4 continuous data samples (that are output as the delayed samples through the FD filters). FIG. 2 shows a basic configuration of the beamforming apparatus employing an FD filter 11 having 4 taps and interpolation ratio of 4. The data sampled on the respective channels are stored within the memory 16 and determined whether to be updated as the block data 12 on the basis of the integer part of the delay value assigned to each channel. The block data 12 on the channels assigned the same fractional part of the delay values are summed and passed through the filter simultaneously and then combined with each other, resulting in beamforming. Since the number of taps of the filter is 4, the number of block data 12 is 4, and the interpolation ratio is 4, the delay values are presented mainly with the fractional parts such as 0, 0.25, 0.5 and 0.75.

The beamforming apparatus includes a plurality of 1:4 demultiplexers each assigned for a channel such that one of the 4 block addresses is assigned to the block data 12. The 4 samples output from the block adders 15 are supplied to the corresponding FD filters 11. Finally, the 4 outputs of the FD filters 14 are combined by the adder 13 such that each FD filter 11 can produce the output as in the case of arranging individual FD filters for respective channels. That is, the FD beamforming apparatus of the present invention can be implemented with 4 FD filters.

The beamforming apparatus of the present invention can be designed in more simplified hardware configuration by exploiting the characteristic of the FD filter. This can be achieved by configuring the beamforming apparatus such that the input sample with no delay (D=0) is bypassed. Also, the 4 tap filter can be implemented with 4 multipliers for D=0.25 and D=0.75 because the coefficients to D=0.75 can be obtained by inversing the coefficients to D=0.25 in time. Also, the input sample to D=0.5 can be processed only with two multipliers since the coefficient values are symmetrically ordered.

Figure 3:
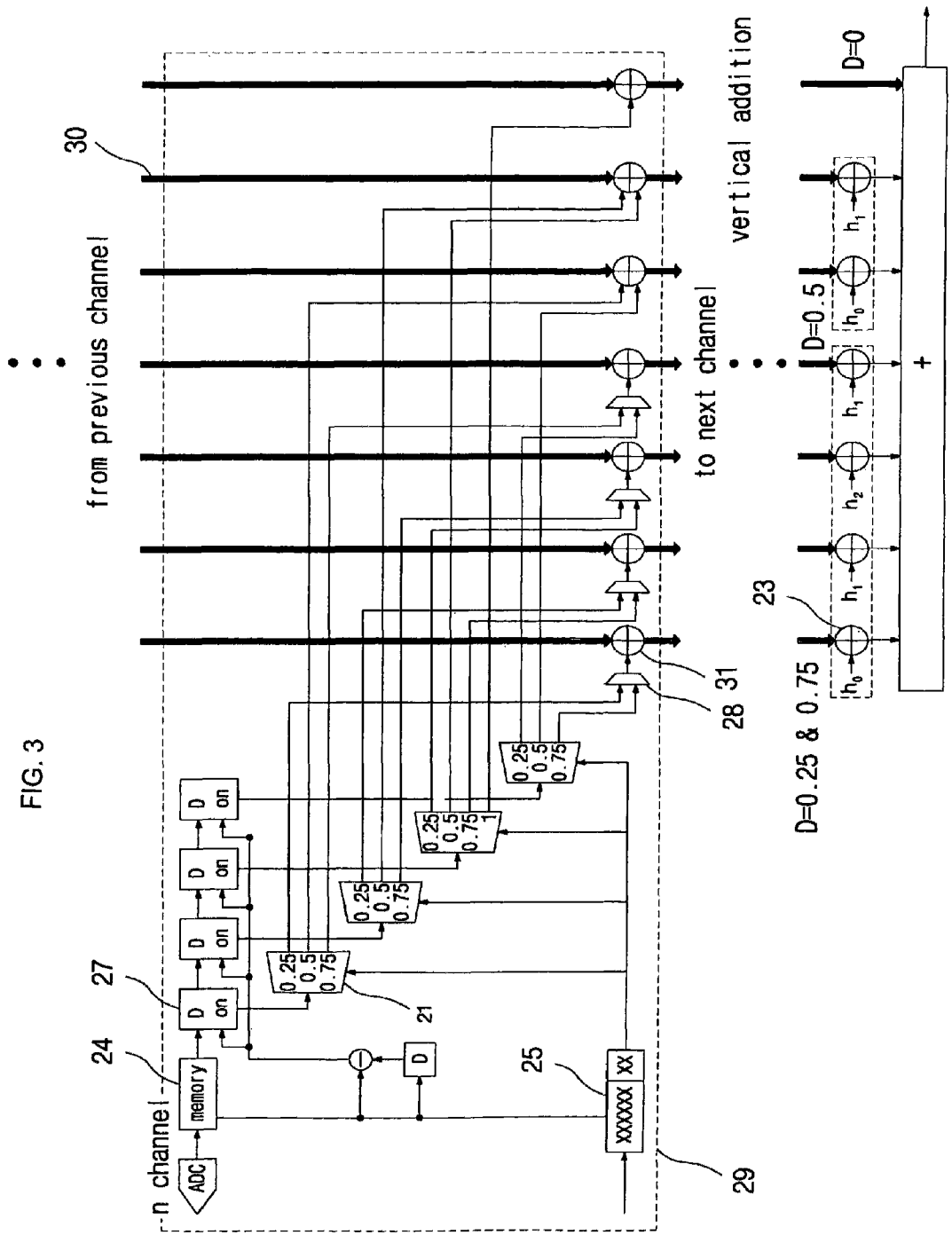
FIG. 3 is a block diagram illustrating a configuration of a beamforming apparatus according to another exemplary embodiment of the present invention.

FIG. 3 is a block diagram illustrating a configuration of a beamforming apparatus according to another exemplary embodiment of the present invention. In FIG. 3, the channel block 29 represents a hardware configuration for 1 channel in the post filtering structure of the present invention. The channel block is iteratively used depending on the number of channels of the beamforming apparatus. Each block is added through a data path 30 directly and then input to an FD filter 23. For example, since 0.25 and 0.75 are inversely ordered but using the same coefficient, only one filter is required in the structure of the channel block 29 in FIG. 3. The filter coefficients of D=0.5 are symmetrically arranged in time such that only 2 multipliers are used in the structure of the channel block 29. In the case of D=0, only the addition of the samples is required regardless of the coefficients.

In FIG. 3, the FD filter of each channel of the beamforming apparatus of FIG. 2 is replaced by a demultiplexer 21 and 6 multipliers 23 are employed. The FD filter coefficients that are multiplicands of the multipliers 23 should be corrected according to the variation of the center frequency and bandwidth of the ultrasonic wave. For this reason, registers are required for storing the multiplicands to be used in the multipliers 23. The register values are updated only when the center frequency of the ultrasonic wave is changed.

The memory 24 is a delay memory for providing integer part of the delay value, and the delay calculator 25 calculates the delay value of the ultrasonic wave differently applied at the target. The resolution of the fractional part of the delay calculator 25 is determined depending on the fineness of the delay value. In the example of FIG. 3, the resolution is increased 4 times such that the fractional part becomes 2 bits. That is, the delay calculator provides the integer part for coarse delay control and the 2-bit fractional part defining the intra-sample delay for fine delay control.

In FIG. 3, the input samples output by the memory 24 are shifted within the dynamic focusing registers 27 using the coarse delay values as in the conventional beamforming apparatus. The fine delay values can be dynamically controlled by connecting two fractional delay bits to the selection line of the demultiplexer 21 on each channel. The dynamic focusing registers 27 are the registers for storing the block data to be used for post-filtering of the present invention. A number of the registers is determined depending on the number of taps of the FD filter. In this embodiment, 4 registers are used with the 4-tap FD filter as shown in FIG. 3. An enable signal is determined according to the delay value calculated by the delay calculator. In more detail, the register is enabled only when the integer part of the delay value is changed such that the value is changed. The demultiplexer 21 cooperates with a multiplexer 28 so as to transfer the value stored within each register to the adder 31 according to the fractional part of the delay value calculated by the delay calculator 25.

Simulation Results

Figure 4:
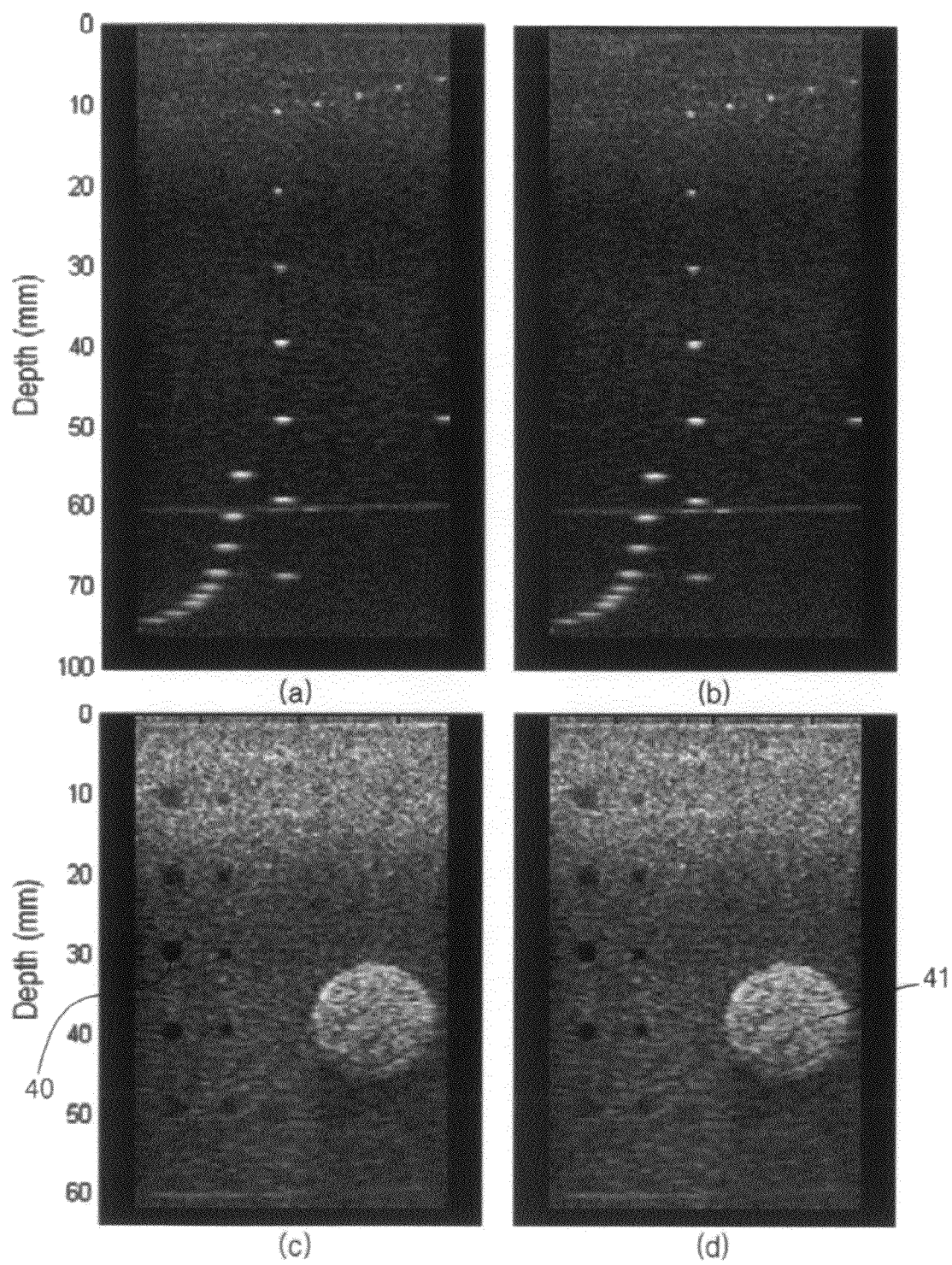
FIGS. 4a to 4d are graphs illustrating simulation results for performance comparison between beamforming apparatus of the present invention and conventional beamforming apparatuses.

In order to evaluate the efficiency of the present invention, the sample RF data were measured at the analog/digital converter (ADC) for each channel of conventional 64-channel ultrasonic scanner. A commercial ATS tissue phantom, Model 539, was scanned by 128 linear array device (6.2 MHz center frequency and 3 cm transmit focusing). FIG. 4a is a screen image illustrating a wire target of the phantom obtained by using a beamforming apparatus according to an embodiment of the present invention, and FIG. 4b is a screen image illustrating a wire target of a phantom obtained by using a 64-tap filter. As shown in FIGS. 4a and 4b, the images are similar to each other.

In FIGS. 4c and 4d, similar results are obtained within other regions of the phantom. Table 1 shows the CNR values measured around the holes (black points) 40 presented at the left sides of the images. In the meantime, the CNR at the broad target area (cyst area) 41 which is brighter than the vicinities around the holes 40 was 7.90 dB when measured by the beamforming apparatus of the present invention and 7.98 dB when measured by the interpolation beamforming apparatus. The simulation results are appropriate for showing the SNR comparison results between the 4-tap FD filter and 64-tap interpolation filter.

TABLE 1

| Depth | FD Beamformer | Interpolation Beamformer |
|---|---|---|
| 2 cm | 7.7 dB | 7.73 dB |
| 3 cm | 10.47 dB | 10.46 dB |
| 4 cm | 9.50 dB | 9.48 dB |
| 5 cm | 3.63 dB | 3.22 dB |

In order to compare the complexities, 4-tap FD beamforming apparatus of the present invention and interpolation beamforming apparatus using the 16-tap and 64-tap are designed by VHDL. The complexities of the beamforming apparatuses in VHDL design, except for memory, were measured by a number of gates in Xilinx field programmable gate array (FPGA). The maximum clock frequency of each design was 55 MHz. The input samples and FD filter coefficients are quantized to 8-bit and 12-bit fixed-point numbers. The interpolation filter is applied with the coefficients optimized by less than 3 times of shift and add operations. The 3 beamforming apparatus were designed with the same delay calculator.

The 64-channel beamforming apparatus using the 64-tap interpolation filter showed 64×25,933 interpolation gates, 11,089 inner channel combination gates, and 83,100 delay calculation gates, to total 1,753,901 gates. In the case of 64-channel beamforming apparatus using 16-tap interpolation filter, 527,789 gates are counted. Meanwhile, the beamforming apparatus of the present invention showed 1,028 control logic gates associated with the demultiplexers and respective channels, 68,515 internal channel combination gates, 26,133 gates for 6 multipliers and adders connected to output of the multipliers. Consequentially, in order to implement with FD beamforming apparatus of the present invention, total of 243,540 gates are required. As a result, the hardware complexity of the beamforming apparatus of the present invention is only 14% of the 64-tap interpolation beamforming apparatus and 46% of the 16-tap interpolation beamforming apparatus.

Although exemplary embodiments of the present invention have been described in detail hereinabove, it should be clearly understood that many variations and/or modifications of the basic inventive concepts taught herein which may appear to those skilled in the present art will still fall within the spirit and scope of the present invention, as defined in the appended claims.

As described above, the beamforming apparatus of the present invention is implemented with a post-filtering technique using fractional delay filter which requires a single filtering process for beamforming regardless of a number of channels of the beamforming apparatus As described above, the beamforming apparatus of the present invention is advantageous in that the beamforming is achieved with a single filtering process regardless of a number of channels of the beamforming apparatus. Since the beamforming apparatus of the present invention is implemented with a post-filtering technique using FD filter, the hardware complexity decreases dramatically. According to the simulation results, the FD filter-based beamforming apparatus can obtain a high quality image nearly identical with that obtained by a delay summation beamforming apparatus employing the 64-tap filter while minimizing the hardware complexity.

What is claimed is:

1. A multichannel beamforming apparatus for an ultrasonic imaging system which includes a memory for storing sampled data for each channel, each channel configured to provide block data on the basis of an integer part of a delay value, comprising:

a plurality of demultiplexers each associated with a different channel and configured to receive the block data from the corresponding channel, each of the plurality of demultiplexers being further configured to select one of a plurality of addresses based on a fine delay value of the corresponding channel;

a plurality of block adders each associated with one of the plurality of addresses configured to be selected by the plurality of demultiplexers, each of the plurality of block adders configured to sum data of a plurality of the different channels output by a plurality of the selecting demultiplexers, and further configured to output a signal corresponding to summed data; and at least one fractional delay filter associated with at least one fine delay value and configured to be coupled to at least one of the plurality of block adders, the fractional delay filter being configured to filter the signal output by the at least one of the plurality of block adders based on the associated fine delay value.

2. The multichannel beamforming apparatus of claim 1 further comprising:

an adder for combining filtered signals output from a plurality of the fractional delay filters.

3. The multichannel beamforming apparatus of claim 1 further comprising:

a plurality of multipliers for multiplying n signals output from the block adders by a predetermined variable; and a combiner for combining signals output from the multipliers.

4. The multichannel beamforming apparatus of claim 3, further comprising a plurality of multiplexers for multiplexing signals output from the demultiplexers and outputting multiplexed signals to corresponding block adders.

5. The system of claim 1 further comprising a plurality of the fractional delay filters each associated with a unique fine delay value, wherein the plurality of the fractional delay filters is less than a number of channels of the beamforming apparatus.

6. The system of claim 5, wherein the block data from a plurality of the channels associated with a same fine delay value is configured to be filtered by a single one of the plurality of fractional delay filters.

7. The system of claim 1, wherein the fine delay value is selected from a set consisting of 0, 0.24, 0.5, and 0.75.

8. The system of claim 1, wherein each of the plurality of demultiplexers is a 1:n demultiplexer installed on a specific channel for outputting n addresses for the specific channel.

9. A beamforming method for an ultrasonic imaging system including a multichannel beamforming apparatus having a memory for storing sampled data for each channel, each channel configured to provide block data on the basis of an integer part of a delay value, comprising:

receiving by a plurality of demultiplexers block data from a corresponding channel and selecting one of a plurality of addresses based on a fine delay value of the corresponding channel;

summing by each of a plurality of adders, each associated with one of the plurality of addresses configured to be selected by the plurality of demultiplexers, data of a plurality of the different channels output by a plurality of the selecting demultiplexers, and outputting a signal corresponding to the summed data; and filtering via at least one fractional delay filter associated with at least one fine delay value and coupled to at least one of the plurality of block adders, the signal output by the at least one of plurality of block adders based on the associated fine delay value.

10. The beamforming method of claim 9 further comprising:

combining filtered signals output by a plurality of the factional delay filters.

11. The beamforming method of claim 9 further comprising:

multiplying the combined signals by respective variables; and combining signals obtained by multiplying.

12. The beamforming method of claim 9, further comprising multiplexing signals output by demultiplexing and outputting multiplexed signals to be combined by address.

13. A multichannel beamforming method comprising:

summing first block data from each of a plurality of channels via a first adder, each of the added first block data being associated with a same first delay value;

providing the summed first block data to a first fractional delay filter corresponding to the first delay value;

summing second block data from each of a plurality of channels via a second adder, each of the added second block data being associated with a same second delay value different from the first delay value;

providing the summed second block data to a second fractional delay filter corresponding to the second delay value;

summing outputs of the first and second fractional delay filters; and outputting a signal corresponding to the summed output.

* * * * *